(12) United States Patent
Ferrer

(10) Patent No.: US 6,378,560 B1
(45) Date of Patent: Apr. 30, 2002

(54) WATER STOPPER AND SOLDER INSTRUMENT

(76) Inventor: Eduardo J. Ferrer, 3150 S. Decatur Blvd., #2, Las Vegas, NV (US) 89102

( * ) Notice: Subject to any disclaimer, the term of this patent is extended or adjusted under 35 U.S.C. 154(b) by 0 days.

(21) Appl. No.: 09/775,698

(22) Filed: Feb. 3, 2001

(51) Int. Cl.[7] ................................................. F16L 55/12
(52) U.S. Cl. .......................................... 138/89; 138/94
(58) Field of Search ............................ 138/89, 97, 93, 138/45, 46, 98, 103, 90; 81/489

(56) References Cited

U.S. PATENT DOCUMENTS

| | | | | |
|---|---|---|---|---|
| 1,747,933 A | * | 2/1930 | Goodman et al. ............ | 138/94 |
| 2,588,188 A | * | 3/1952 | Weisman .................. | 138/94 X |
| 3,015,469 A | * | 1/1962 | Falk ........................ | 138/89 X |
| 3,173,449 A | * | 3/1965 | Custer et al. ................. | 138/93 |
| 3,692,059 A | * | 9/1972 | Ice, Jr. ......................... | 138/89 |
| 3,763,896 A | * | 10/1973 | Horne et al. .................. | 138/89 |
| 4,584,755 A | * | 4/1986 | Lundquist ................. | 138/89 X |
| 4,962,681 A | * | 10/1990 | Yang .............................. | 81/54 |
| 5,119,861 A | * | 6/1992 | Pino ............................ | 138/89 |
| 5,224,516 A | * | 7/1993 | McGovern et al. ........... | 138/97 |
| 5,357,763 A | * | 10/1994 | Vogel ............................ | 62/77 |
| 5,558,130 A | * | 9/1996 | McCabe et al. .............. | 138/89 |
| 5,819,804 A | * | 10/1998 | Ferrer et al. .................. | 138/89 |
| 6,101,909 A | * | 8/2000 | Djie ............................ | 81/489 |
| 6,161,256 A | * | 12/2000 | Quiring et al. ........... | 81/489 X |

* cited by examiner

*Primary Examiner*—Patrick Brinson
(74) *Attorney, Agent, or Firm*—Quirk & Tratos

(57) ABSTRACT

An instrument for temporarily preventing fluid flow along a pipe utilizing a manually actuatable handle, a seal assembly and a flexible cable releasably connected between the handle and the seal assembly. The handle includes a handgrip and a depressible lever pivotally connected to the handgrip to articulate a handle and wire within a sleeve respectively connected to a first and second compression element to expand by compression an elastomeric seal captured therebetween.

19 Claims, 5 Drawing Sheets

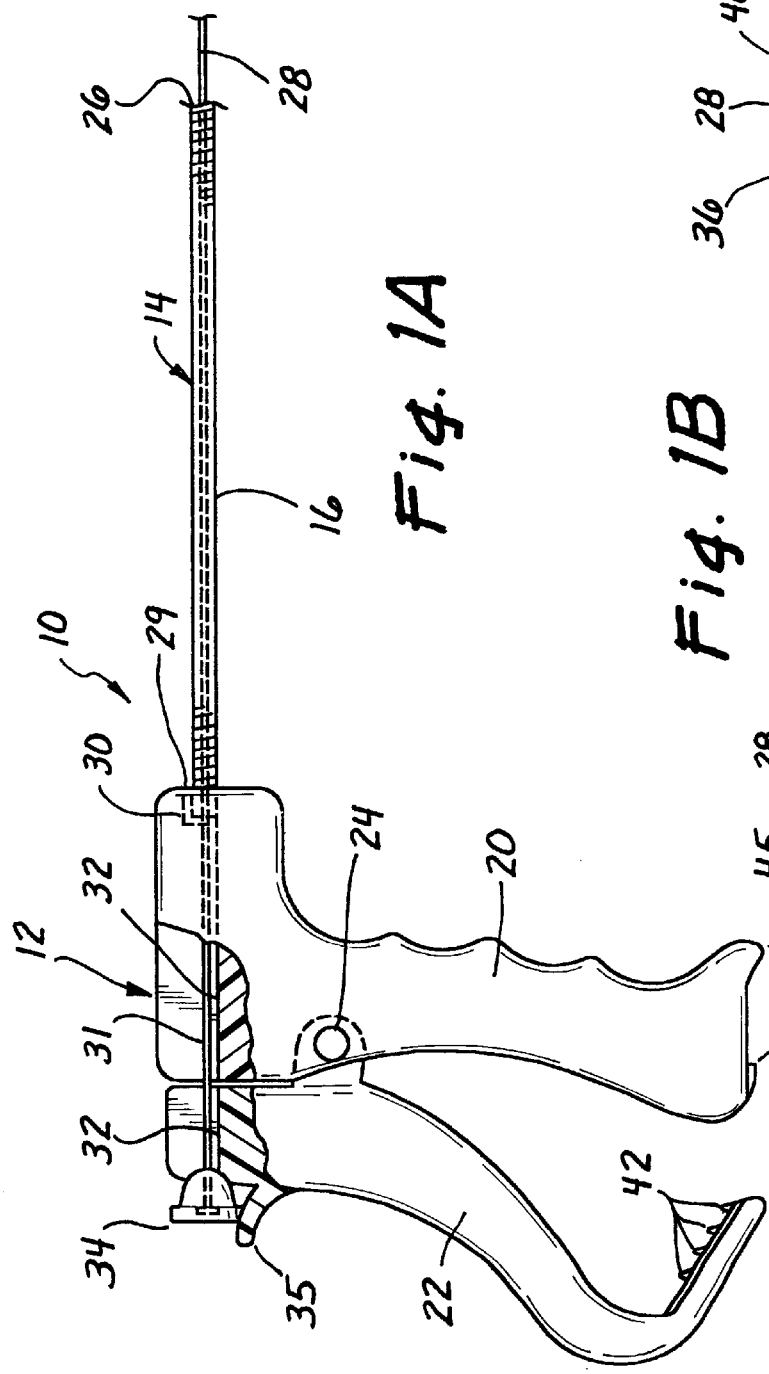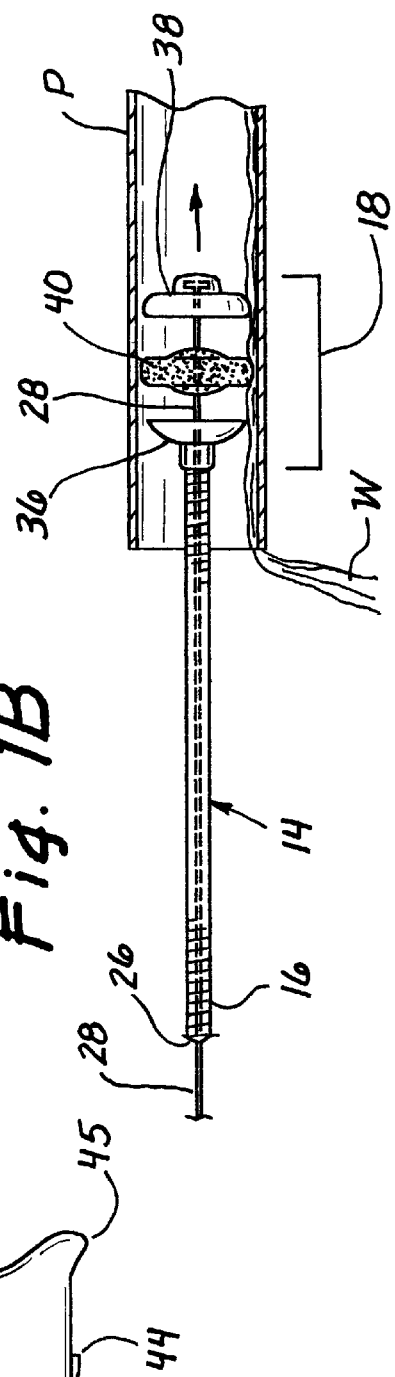

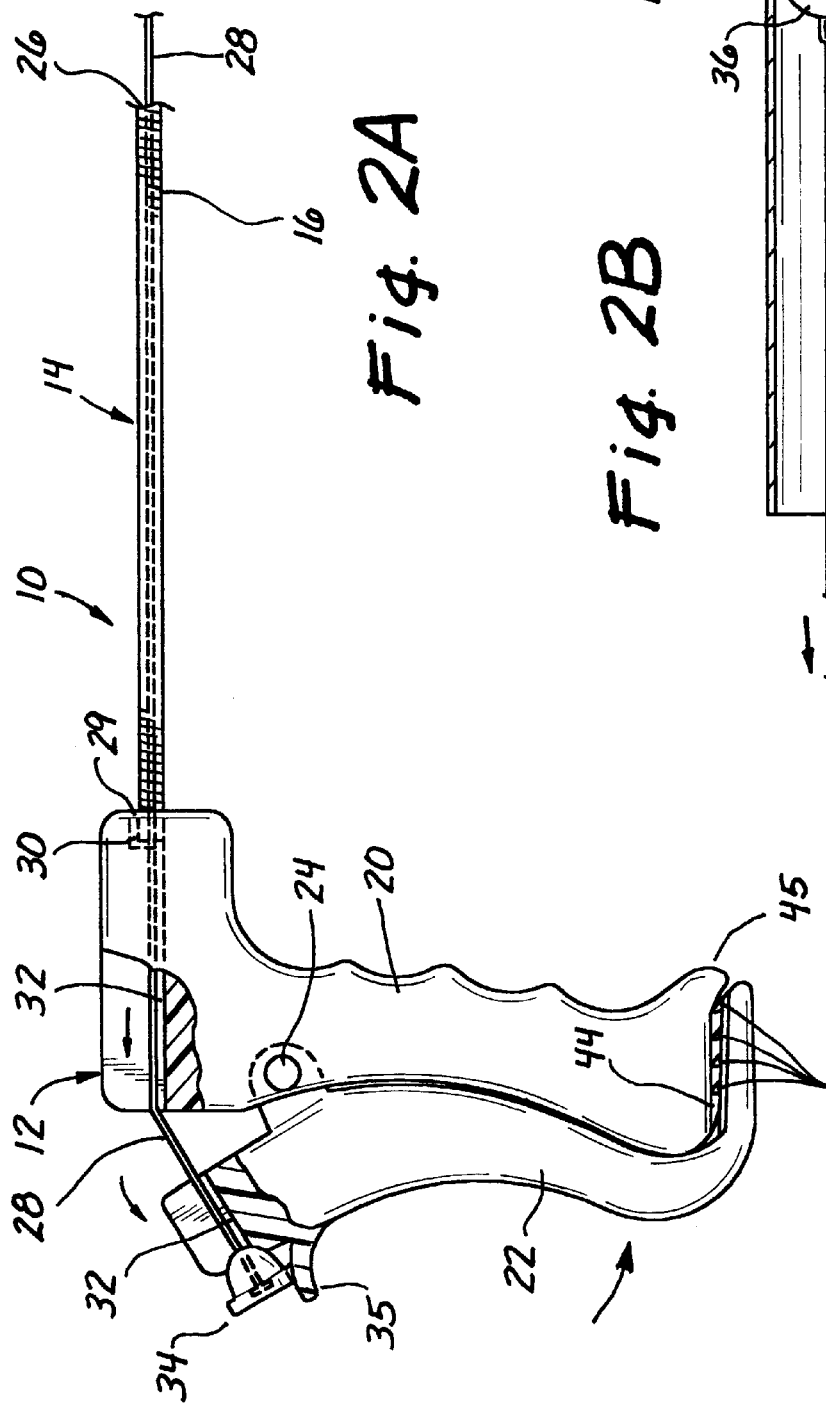
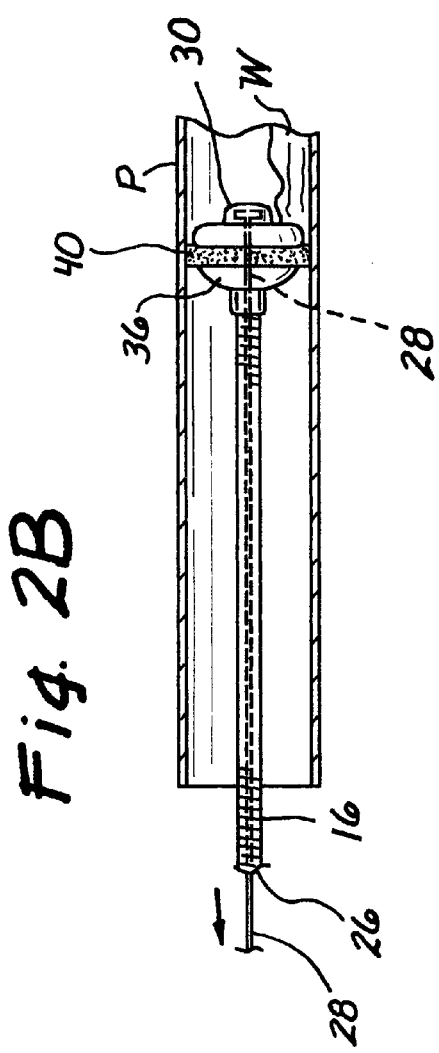

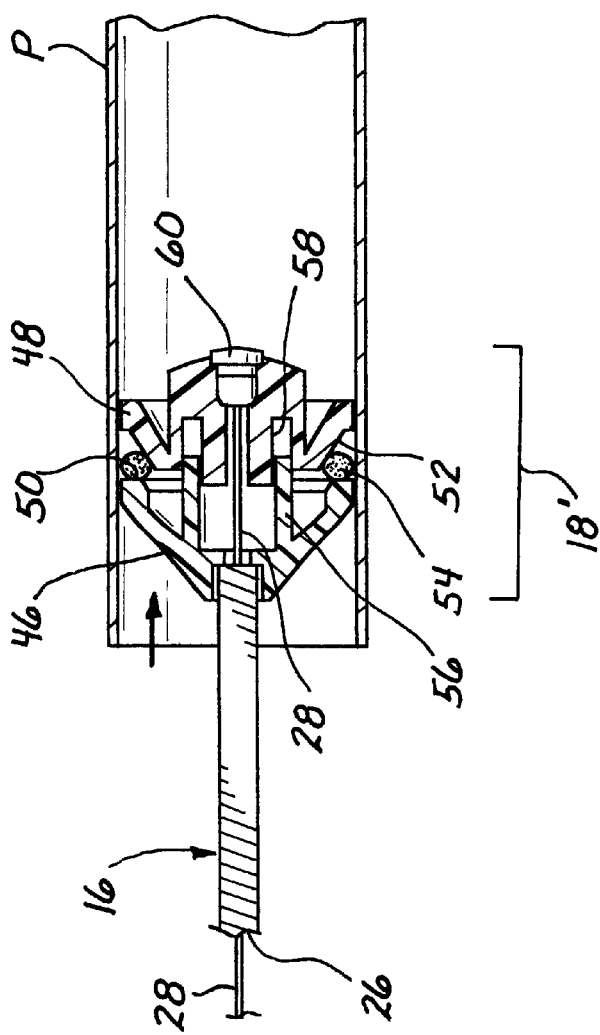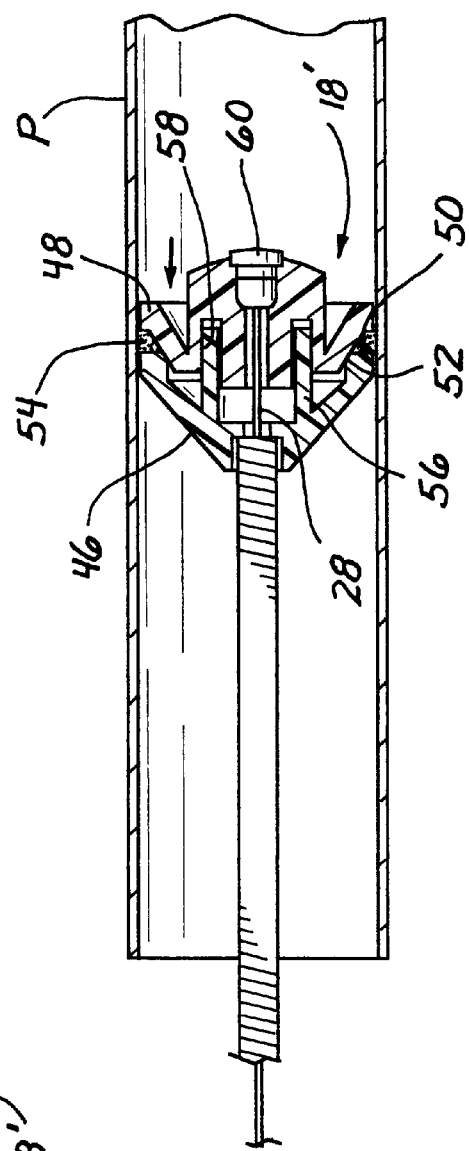

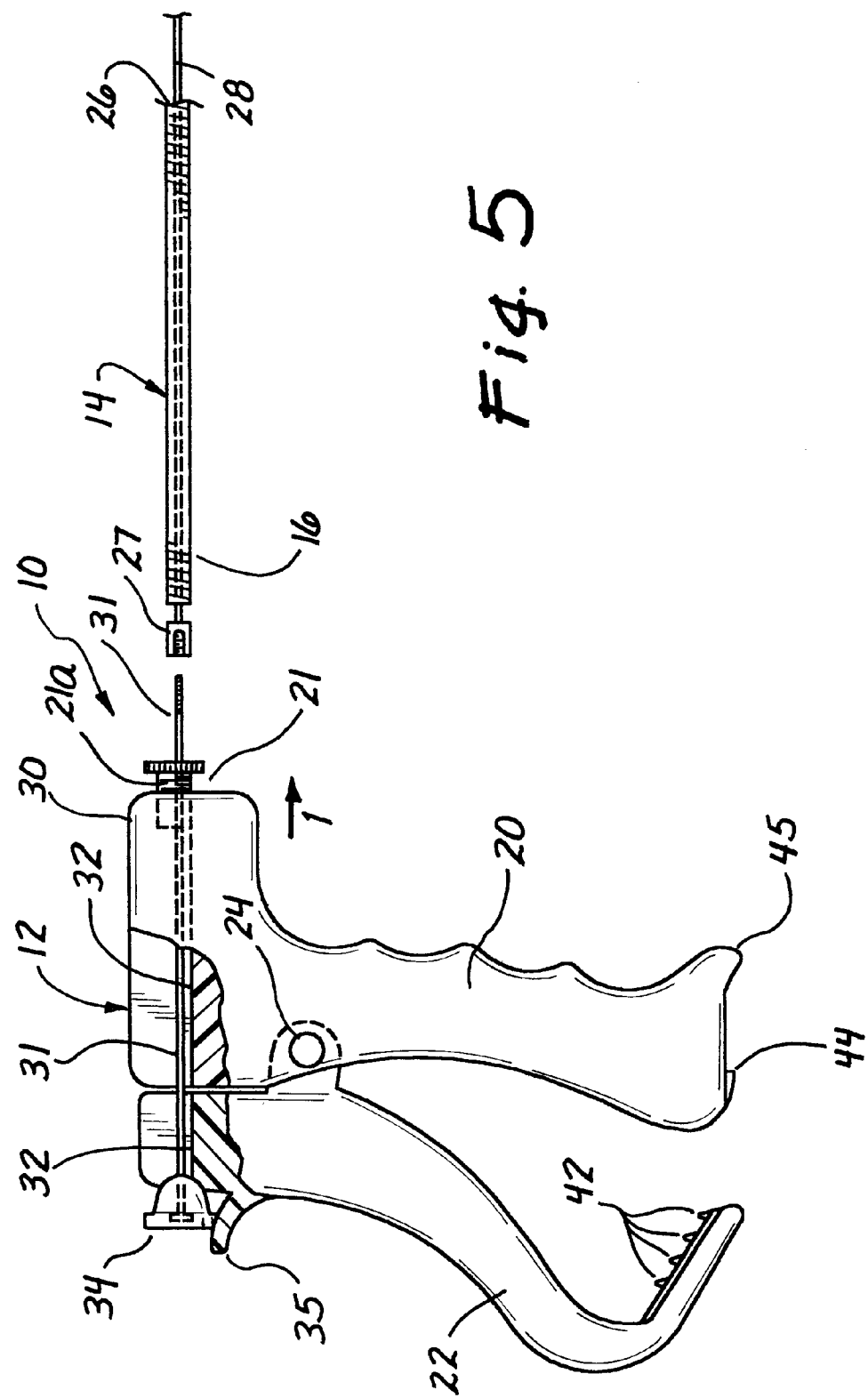

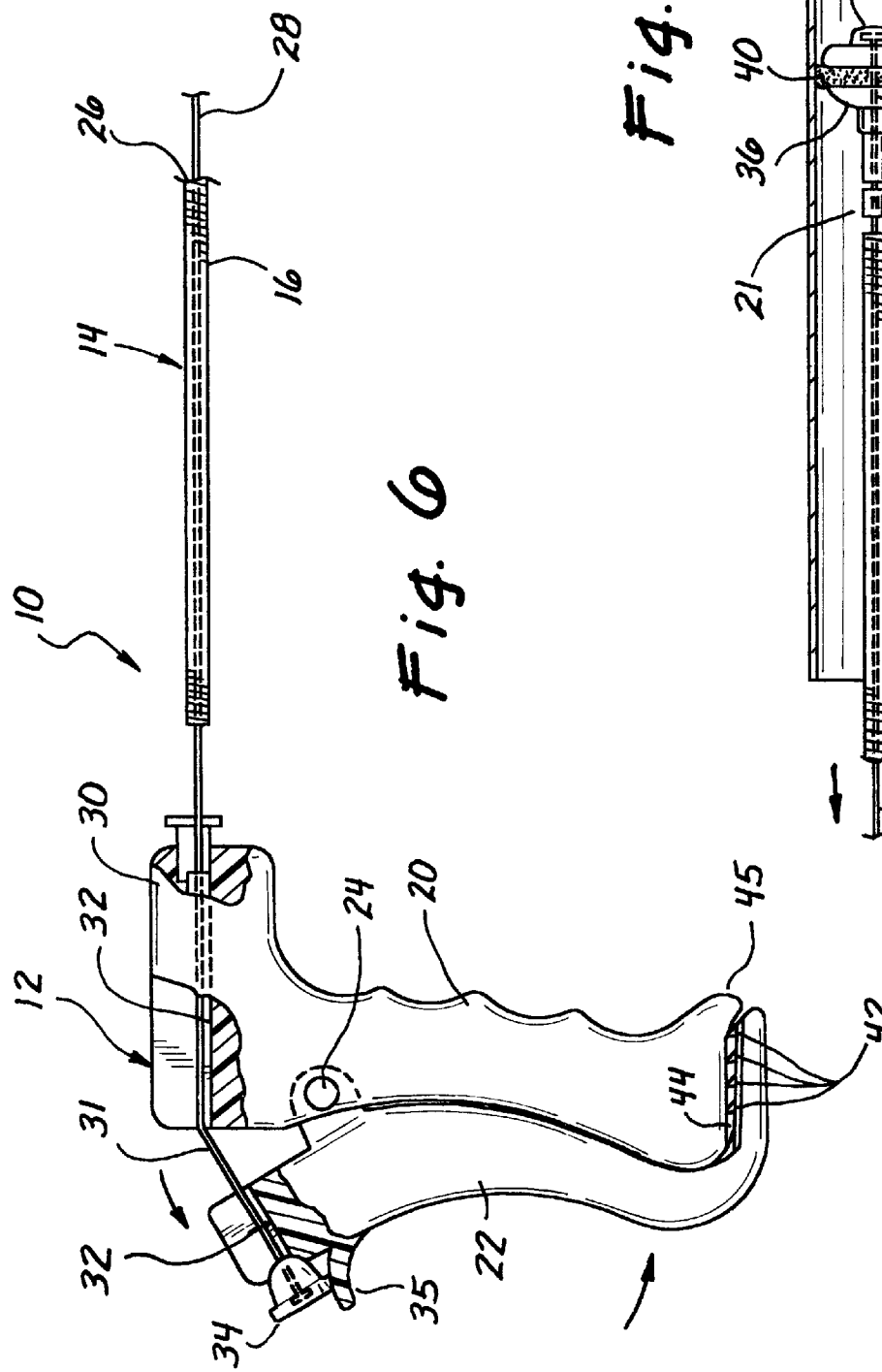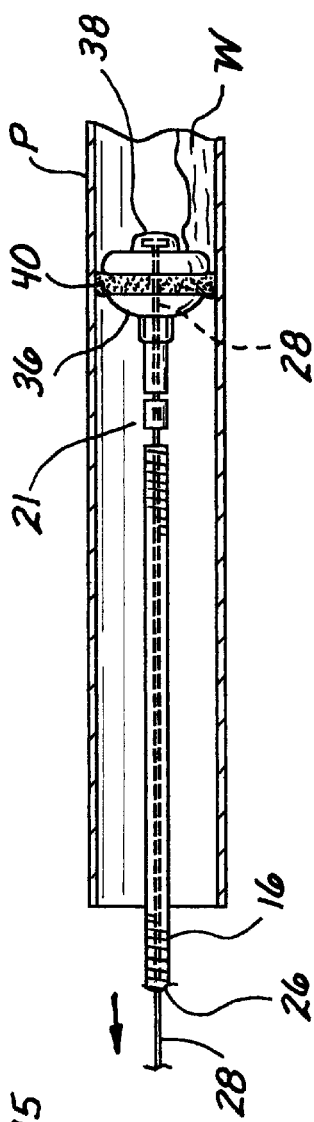

WATER STOPPER AND SOLDER INSTRUMENT

BACKGROUND OF THE INVENTION

1. Field of the Invention

This invention relates to the field of tools used in the installation and maintenance of plumbing conduits and pipe, and in particular concerns an improved hand operated tool for temporarily plugging pipe to exclude liquid during a pipe soldering operation or while other work is done on or near the open pipe end.

2. Description of the Prior Art

Many tools are known and used in the plumbing trade for the aforementioned purpose. In general, such tools have a seal element which is introduced into an open end of a pipe to be soldered and is expanded in diameter to make a water tight seal inside the pipe.

The existing tools are cumbersome, costly and require frequent replacement of parts. A continuing need exists for such tooling which is long lasting and safe to operate at low cost.

SUMMARY OF THE INVENTION

The present invention addresses the aforementioned need by providing an instrument for temporarily sealing a pipe against fluid flow which has a manually actuatable handle and a sealant unit engaged to the handle. The sealant unit has a seal assembly and a flexible cable operatively connecting the handle and the seal assembly. The seal assembly has a thermoplastic elastomeric seal contained between first and second compression elements along an axial direction of the cable. The thermoplastic elastomeric seal is far longer lasting than other elastomers such as rubber. When rubber seals are exposed to heat, as required in soldering for example, "dry rotting" occurs, which drastically reduces the seal life. The seal of the present invention, therefore, reduces replacement costs.

The cable is operative for urging the compression elements together thereby to achieve expansion of the thermoplastic elastomeric seal in a radial direction responsive to manual actuation of the handle from a normal to a depressed condition. Preferably the actuating handle includes locking elements for retaining the handle in a depressed condition when actuated, so that sealing engagement of the seal with the interior surface of a pipe can be maintained without further effort on the part of the user while repair or maintenance work is performed on the pipe.

The actuating handle may have first and second handle members, such as a handgrip and a lever, movable relative to one another from a normal to a depressed condition. The cable may have a sleeve connected at one end thereof to a first handle member and at an opposite end thereof to one of the compression elements, and a wire axially slidable in the sleeve, the wire being connected at one end thereof to a second member of the handle and at an opposite end thereof to another of the compression elements, such that the wire is retracted into the sleeve responsive to relative movement of the handle members. The wire may pass through the first compression element and through the thermoplastic elastomeric seal.

The sleeve is preferably a flexible compressed steel spring to allow maximum flexibility of the cable. Whereas other flexible steel tubing is susceptible to fatigue and fracture upon repeated bending, as through elbows in piping, the compressed steel spring resists such fatigue, thereby increasing the life of the cable.

The cable may alternatively have a sleeve connected at one end thereof to a first handle member and at an opposite end thereof to a connector. This connector is adapted to allow mating engagement of the cable to a modified sealant unit. The modified sealant unit includes a seal assembly and a cable portion. The cable portion is attached to the seal assembly and is further adapted to allow mating engagement between the modified sealant unit and the connector of the cable thereby allowing the user to simply detach the sealant unit from the cable when such becomes desirable. Therefore, the sealant unit may be replaced separately from the cable so that when one or the other becomes worn the entire piece consisting of the cable and sealant unit will not need to be replaced. Due to uneven wear between these two components, this function is highly desirable.

The thermoplastic elastomeric seal element is expanded radially by axial compression of the seal element between the compression elements. In such case the seal element may be axially mounted to the cable. In one embodiment of the invention, the thermoplastic elastomeric seal is expanded by stretching to an increased radius, as by being displaced axially on a tapering surface such as a conical surface. In the latter case, one compression element has the tapering surface and the other compression element urges the seal element along the tapering surface in a direction of increasing width to stretch the seal element. The tapering surface may be a frusto-conical surface coaxial to the cable.

The first element of the handle may be a handgrip and the second element of the handle may be a depressible lever pivoted to the handgrip. The locking elements of the actuating handle may be detent elements on each of the handgrip and the lever engageable with each other upon depression of the lever. The detent elements may operate in the manner of a ratchet, such as a series of teeth on said depressible lever sequentially engageable with a tooth detent on the handgrip during progressive depression of the lever. Desirably, the locking elements will retain the lever against return to a normal condition through a range of depressed conditions until the locking elements are disengaged from each other by the user of the tool.

Safety features are included to protect the user from discomfort resulting from depression of the lever. One such feature is the finger barrier. Upon depression of the lever, a user's small finger may be pinched between the lower ends of the handgrip and the lever. Moreover, the impact of the lower end of the lever against the small finger of the user upon depression may likewise cause substantial discomfort. Therefore, a finger barrier is provided to protect the small finger of the user from either of these occurrences.

Another safety feature provided is the hand barrier. The hand barrier is provided on the lever to prevent pinching of the portion of the users hand between the index finger and the thumb when utilizing the device.

In one form of the invention the sealant unit is removably engaged to the handle such that different sealant units, each having thermoplastic elastomeric seals of different radial dimension, may be interchangeably engaged to the handle so as to fit a pipe of given standard diameter. Therefore the cable may be disengageable from the handle such that different sealant units each having its own cable and seal assembly may be interchangeably engaged to the handle, so that a tool kit including multiple sealant units each with a seal assembly of different diameter may be provided.

In another form of the invention a modified sealant unit is releasably attached to a cable adapted at both ends to be releasably attachable to the modified sealant unit at one end and the handle at the other end. Therefore, the modified sealant unit can be removed from the handle either alone or in conjunction with the cable.

In yet another form of the invention, the actuating handle may have a third member which is adopted to releasably attach to the cable. The handle may have a channel with a wire section therein connected to a first handle member at one end and the third handle member at the opposite end. Within this channel, an axially disposed spring member may be included to bias the wire toward the third handle member. Therefore, the cable may be releasably attached to the handle quickly and easily.

BRIEF DESCRIPTION OF THE DRAWINGS

FIG. 1A is a side view partly in section showing the hand grip in normal position;

FIG. 1B is a side view of the seal assembly inserted into a pipe in the normal condition corresponding to the handle position of FIG. 1A;

FIG. 2A is a view as in FIG. 1A showing the hand grip in depressed condition for actuating the seal assembly;

FIG. 2B is a view of the seal assembly actuated to an expanded diameter for making sealing engagement with the interior wall surface of the pipe;

FIG. 3 is a sectional view in an axial direction of an alternate seal assembly suitable for larger diameter pipe, the seal being shown in its normal condition within El pipe;

FIG. 4 show the seal of FIG. 3 in actuated condition to make sealing engagement with the interior wall surface of the pipe.

FIG. 5 is a side view partly in section showing the modified hand grip in normal position;

FIG. 6 is a side view partly in section showing the modified hand grip in depressed condition for actuating the seal assembly.

FIG. 7 is a view of the seal assembly with the end connection which allows replacement of the seal assembly without disconnecting the sleeve.

DESCRIPTION OF THE PREFERRED EMBODIMENT

The above specification, examples and data provide a complete description of the manufacture and use of the composition of the invention. Since many embodiments of the invention can be made without departing from the spirit and scope of the invention, the invention resides in the claims hereinafter appended.

With reference to the accompanying drawings, the hand tool shown in part in each of FIGS. 1A and 1B. generally designated by the numeral 10, has an actuating handle 12 to which is an interchangeable sealant unit 14. The sealant unit 14 includes a flexible cable 16 and a seal assembly 18.

The handle 12 has a handgrip 20, and a lever 22 pivoted by a spindle at 24 to the handgrip. The handgrip, lever and spindle may all be made of a suitable heat resistant plastic molded in two pieces and screwed together or may be made of metal with a plastic or rubber covering. Depression of the lever to the depressed position shown in FIG. 2A, as by squeezing the handle in the hand of an operator, causes the upper ends of the lever and the handgrip to move apart from each other.

The cable 14 has an outer sleeve 26 and a wire 28 axially slidable in the sleeve. The wire 28 may be ¹⁄₁₆th inch flexible steel wire (braided type), while the sleeve may be a flexible compressed steel spring, approximately 20 inches long and ⁵⁄₃₂ inch in diameter. One end of the sleeve 29 is fitted to the upper end of the handgrip at 30 and the corresponding end of the wire lies within a channel, slot or groove 32 extending along the upper ends of both the handgrip and the lever and is engaged to the upper end of the lever by an enlarged bell-shaped plastic anchor 34. The bell shape of the anchor 34 is such that the operator may readily grasp the anchor to engage the seal unit to the handle. Therefore, an exposed portion of the wire 28 extends from the end 29 of the cable sleeve along the slot 32, so that the wire end is removably secured by the anchor 34 at one end of the slot and the sleeve end 29 is removably secured to the handle at the opposite end of the slot 32. The length of the exposed wire portion in the slot is such as to maintain sufficient tension against the handle at the opposite ends of the slot to retain engagement of the cable to the handle.

FIG. 5 shows another form of the invention in which the handle actuator is; a self-contained unit and is separate from the cable, but is attachable thereto by means of a connector 21. In this form of the invention, the handle 12 has a handgrip 20, a lever 22 and a connector 21. A wire 31 is permanently located within channel 32 and attached at one end to the upper end of the lever 22 and attached at the other end to the connector 21. This connector is spring loaded by a compressed spring 21a to bias the wire 31 in the direction of the connector shown by arrow 1. Therefore, when in the normal position (FIG. 5) a portion of the wire 31 protrudes from the connector 21. The end of the wire protruding outward is adapted to matingly engage the wire 28 of the sealant unit 14.

The opposite end of the sleeve 26 carries a stationary compression plate 36. The wire passes through the center of the stationary compression plate 36 and through a disk shaped thermoplastic elastomeric seal 40, and supports at its opposite end a movable compression plate 38. The seal 40 is disk shaped with a lens shaped central area of increased cross-sectional thickness, as seen in FIG. 1B. The compression plate 36 is circular and dished to generally conform to the convex curvature of the lens shaped center of the seal 40. The compression plate 38 is disk-shaped also with a lens shaped central area of increased cross-sectional thickness. The increased cross-sectional area on the compression plate 38 reduces the possibility of the plate shearing due to forces thereon by the compression of the lever. The diameter of the compression plates 36, 38 is slightly undersized to the diameter of the pipe P, as is the normal, uncompressed diameter of the seal 40.

Actuation of the handle 12 causes the upper end of the lever to pull on the wire 28 by means of the bell-shaped anchor 34, retracting the wire 28 into the sleeve 26 and urging the movable compression plate 38 against the stationary compression plate 36. The thermoplastic elastomeric, seal 40 is compressed between the plates 36, 38 in an axial direction of the wire 28 and expands in a radial direction of the wire 28. In an initial uncompressed condition of the seal 40, shown in FIG. 1, the seal has a diameter smaller than the inside diameter of the pipe P which is to be temporarily plugged. Upon actuation of the handle 12 the diameter of the seal 40 expands into 9 sealing engagement with the interior of the pipe P, as illustrated in FIG. 2B, to contain water flow W.

The self contained handle functions similar to the handle described above wherein the bell anchor 34 of the sealant unit is attached to the upper end of the levier 22. In this alternative form of the handle, (FIGS. 5 & 6) a wire 31 is disposed in a channel, slot or groove 32 along the upper ends of the handgrip and the lever. This wire 31 is engaged to the upper end of the lever by the bell shaped plastic anchor 34 at one end and the connector 21 at the other end. The wire 31 is biased forward toward the front of the handle by a spring located at the connector 21 and attached to the wire 31. A portion of the wire 31 protrudes from the front of the handgrip 20 through the connector 21.

Actuation of the handle 12 causes the upper end of the lever to pull on the wire 31, thereby retracting the wire portion protruding from the front of the handgrip 20 into the channel of the handgrip 32. When the wire 31 is matingly attached to the wire 28 of the sealant unit 14 such retraction of the wire 31 causes the moveable compression plate 38 to move against the stationary compression plate 36 forcing the radial expansion of the thermoplastic seal 40.

The handle 12 has locking elements operative for retaining the lever 22 in depressed condition, so as to maintain sealing engagement of the seal element 40 with the pipe P without further manual force applied to the handle 12. The locking elements, shown in disengaged condition in FIG. 1A, are a series of four teeth 42 on an upward facing surface of the bottom of the lever 22. The teeth 42 sequentially engage with a 10 detent tooth 44 dependent from the bottom of the handgrip 20 as the lever is depressed towards the handgrip 20, in the manner of a ratchet. Sealing engagement with the pipe P is maintained until the interlocking teeth 42, 44 are disengaged from each other arid the lever 22 is returned to its initial position of FIG. 1A, allowing the wire 28 to extend from the sleeve and slide to its normal position in the same Figure thereby separating the two compression plates 36, 38 which in turn permits the elastomeric seal 40 to expand axially and retract radially to its normal diameter. The seal assembly 18 may then be withdrawn from the pipe P by pulling away the handle 12.

To prevent the operator's hand from being pinched in actuating the handle, safety barriers may be added. A hand barrier 35 is formed from the upper portion of the lever so that the flesh between the operator's thumb and index finger is not caught under the plastic anchor 34 while actuating the handle. Likewise, a finger barrier 45 is added to prevent the skin of the operator's small finger from being caught between the lower ends of the lever and handgrip while actuating the handle.

The sealant unit 14 is interchangeable on the handle 12 with other similar sealant units which differ in the diameter of the elastomeric seal 40, and in the size of the compression plates 36, 38 needed for compressing each particular size of elastomeric element. The operation of each interchangeable sealant unit 14 by means of the actuating handle 12 remains the same, however, the methods of attachment may vary.

In one form of this invention, the channel 32 of the handle is exposed to view from atop the handle. This opening allows the user to connect the end of the sealant unit 14 having the wire 28 exposed and the anchor 34 attached, thereto, to the handle. 11.

The user attaches the sealant unit to the handle by first positioning the end portion sleeve 30 into a slot 29 at the front of the handgrip 20. The user then places the exposed portion of the wire into the channel 32 of the handle and connects the anchor 34 to the top rear portion of the lever 22.

In another form of this invention the channel 32 of the handle is not exposed to view from atop the handle. In the self contained handle, the wire 31 is permanently disposed within the channel 32 and connected to the lever 22 at the top end thereof by the anchor 34 and to the handgrip at the connector 21. The sealant unit is therefore connected to the handle by means of connector 21. Connection of the wire 31 of the handle 12 and the wire 28 of the sealant unit may be accomplished by a number of different means. Shown in FIG. 5, the end of wire 31 is threaded so as to engage a similarly threaded female adapted connector 27. A sleeve portion (not shown) may be snapped on this portion to protect the exposed wire 31, 28 connection. Further, a similar connector may be added to the end of the cable 16 proximate the seal assembly 18 to allow replacement of the seal assembly 18 and cable 16 separately.

FIGS. 3 and 4 depict an alternative form 18' of the seal assembly for use with the actuating handle 12 according to this invention. The alternate seal 18' also has two compression elements 46 and 48 which have an annular surface 50 on one compression element axially facing a frusto-conical surface 52 coaxial with wire 28 on the other compression element. An elastomeric element in the form of annular rubber gasket 54 is seated on the frustoconical surface 52 near the smaller diameter, inner end of the surface 52. A cylindrical projection 56 of the compression element 46 slides axially in a cylindrical recess 58 defined in the compression element 48, to restrict the two compression elements to axial movement relative to each other in response to actuation of the handle 12. Actuation of the seal assembly 18' is similar to that described in connection with the seal assembly 18 of FIGS. 1A through 2B. Depression of the lever 22 relative to the handgrip 20 causes retraction of the wire 28 into the sleeve 26. The end of the wire is anchored at 60 to the center of compression element 48 and draws that compression element against compression element 46. The annular surface 50 advances axially against the frusto-conical surface 52 and urges the annular gasket 54 towards the larger diameter end of the frusto-conical surface 52, thereby stretching the gasket 54 from its normal, initial diameter of FIG. 2 to an expanded outer diameter which, as shown in FIG. 4, slightly exceeds the outer diameter of both compression elements 46 and 48. The radial dimensions of the compression elements, the taper of the frustoconical surface 52 and the expanded outer diameter of the rubber gasket 54 are selected and configured such that the periphery of gasket 54 makes radial sealing engagement with the cylindrical interior wall of a pipe P of given diameter.

Pipes typically encountered in the plumbing trade, primarily copper pipe, are in a relatively small number of standardized pipe diameters, and the present invention contemplates a tool kit which includes an actuating handle 12 and a number of sealant units 14, each sealant unit having a seal assembly 18, 18' sized to make sealing engagement with a different pipe diameter, so as to cover a range of pipe diameters, preferably a range of pipe diameters most likely to be encountered by the plumbing personnel for whom the tool kit is intended.

It has been found that the seal assembly configuration of FIGS. 1B, 2B while relatively simple to make, is best suited for smaller diameter pipes, for example, from about one-half inch diameter to about one inch in diameter due to the greater compression force needed to achieve sufficient radial expansion in larger sizes of the thermoplastic elastomeric seal 40. The more complex seal assembly of FIGS. 3 and 4 is easier to actuate for larger diameters of the elastomeric gasket 54 than the disk seal 40 of FIGS. 1B, 2B.

The water supply valve (not shown in the drawings) to the pipe P should be closed during repair or maintenance procedures using the tool 10 of this invention because the seal assemblies 18 and 18' are not intended to seal against a high pressure water supply, but rather to exclude residual water W in the pipe system from the portion of the pipe P being worked on.

I claim:

1. An instrument for temporarily preventing fluid flow along a pipe, comprising:

a manually actuatable handle releaseably engaged to a sealant unit proximate a channel along an end of said handle;

said sealant unit having a seal assembly at an end of a flexible compressed spring operatively connecting said handle and said seal assembly;

said handle comprising a handgrip and a lever moveable relative to one another from a normal to a depressed condition and locking means for retaining said lever in depressed condition relative said handgrip; and said seal assembly comprising a thermoplastic elastomeric seal contained between first and second compression elements along an axial direction of said compressed spring, said compressed spring being operative for urging said compression elements together thereby achieving expansion of said thermoplastic elastomeric seal in a radial direction responsive to manual actuation of said handgrip to a depressed condition.

2. The instrument of claim 1 wherein the locking means comprises detent elements on each of the handgrip and lever engageable with each other upon depression of the lever.

3. The instrument of claim 2 wherein the detent elements comprise a ratchet on said lever and a tooth detent on said handgrip.

4. The instrument of claim 3 further comprising a finger barrier to protect the fingers of the user from discomfort associated with depression of said lever.

5. The instrument of claim 1 wherein the compressed spring is connected at one end thereof to the handgrip and at an opposite end thereof to one of the compression elements, and a wire axially moveable inside said compressed spring, said wire being axially moveable along the handle channel and being connected at one end thereof to the lever and at an opposite end thereof to another of the compression elements, such that said wire is retracted into said compressed spring responsive to relative movement of said lever and said handgrip.

6. The instrument of claim 5 further comprising a hand barrier proximate the connection of the wire and the lever to protect from discomfort the portion of the users hand between the index finger and the thumb when utilizing the device.

7. The instrument of claim 5 wherein the sealant unit is removeably engaged to the handle such that different sealant units each having thermoplastic elastomeric seals of different radial dimension may be interchangeably engaged to the handle.

8. The instrument of claim 7 wherein the sealant units are removeably engaged to the handle by unlatching the connector proximate the lever and removing the wire from the handle channel.

9. The instrument of claim 7 wherein the sealant units are removeably engaged to the handle by connectors adjacent the handgrip at a position opposite the lever, said connectors being adapted to engage the compressed spring and wire therein to allow relative movement there between upon depression and release of said lever.

10. The instrument of claim 1 wherein the seal element is generally disk shaped and axially mounted to the spring.

11. The instrument of claim 1 wherein the seal element is annular and supported on a surface one of the compression elements tapering in a direction axial of the spring thereby causing radial expansion of said seal upon depression of the lever by stretching said seal to an expanded outer diameter.

12. An instrument for temporarily preventing fluid flow along a pipe comprising:

a manually actuatable handle having top and bottom portions, said handle including a handgrip, a depressible lever pivotally connected to said handgrip, a channel proximate said top portion and therethrough, a connector, a wire along said channel connected to said lever and said connector and detent element proximate said bottom portion;

a seal assembly comprising a thermoplastic elastomeric seal contained between first and second compression elements; and a flexible cable releasably connected between said handgrip and seal assembly.

13. The instrument of claim 12 wherein the detent elements comprise a ratchet on the lever and a tooth detent on the handgrip.

14. The instrument of claim 12 wherein said handgrip further comprises a finger barrier proximate said bottom portion and a hand barrier proximate said top portion.

15. The instrument of claim 12 wherein the flexible cable includes a sleeve having an axially moveable wire therein connected at both ends thereof by connectors adapted to allow free axial movement of the wire relative to said cable upon depression of the lever relative to the handgrip.

16. The instrument of claim 15 where in the seal assembly is releaseably connected to the cable adjacent one of the connectors.

17. The instrument of claim 12 wherein the flexible cable is connected at one end thereof to the handgrip proximate the connector and at the opposite end thereof to one of the compression elements, and a wire axially moveable inside said cable, and being connected at one end thereof to the connector and at an opposite end thereof to another of the compression elements, such that said wire is retracted into said cable responsive to relative movement of said lever and said handgrip.

18. An instrument for temporarily preventing fluid flow along a pipe, comprising:

a manually actuatable handle having top and bottom portions, said handle including a handgrip, a depressible lever pivotally connected to said handgrip, a channel proximate said top portion and therethrough, a connector, a first wire along said channel connected to said lever and said connector and detent elements and a finger barrier proximate said bottom portion and a hand barrier proximate said top portion;

a seal assembly comprising a thermoplastic elastomeric seal contained between first and second compression elements; and a compressed spring releaseably connected between said handgrip and one of said compression elements and having a second wire axially slidable within said spring and being releaseably connected between said first wire and the other of said compression elements, said spring being operative for urging said compression elements together to achieve radial expansion of said thermoplastic seal relative said spring responsive to manual depression of said lever against said handgrip.

19. The instrument of claim 18 wherein the spring includes a connector adapted to allow replacement of the seal assembly without detaching said spring from the handle.

* * * * *